(12) United States Patent
Sako

(10) Patent No.: US 12,060,244 B2
(45) Date of Patent: Aug. 13, 2024

(54) IMAGE FORMING APPARATUS

(71) Applicant: CANON KABUSHIKI KAISHA, Tokyo (JP)

(72) Inventor: Tadahiro Sako, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/346,316

(22) Filed: Jul. 3, 2023

(65) Prior Publication Data
US 2023/0339710 A1    Oct. 26, 2023

Related U.S. Application Data

(60) Division of application No. 17/527,316, filed on Nov. 16, 2021, now abandoned, which is a continuation of application No. 16/807,560, filed on Mar. 3, 2020, now Pat. No. 11,198,573.

(30) Foreign Application Priority Data

Mar. 6, 2019   (JP) ................................ 2019-040120

(51) Int. Cl.
| | | |
|---|---|---|
| B65H 5/06 | (2006.01) | |
| G03G 15/00 | (2006.01) | |
| G06F 113/16 | (2020.01) | |

(52) U.S. Cl.
CPC ......... B65H 5/062 (2013.01); G03G 15/6529 (2013.01); *B65H 2403/92* (2013.01); *B65H 2557/30* (2013.01); *G06F 2113/16* (2020.01)

(58) Field of Classification Search
CPC ................ B65H 5/062; B65H 2403/92; G03G 15/6529; G03G 21/1652; G06F 2113/16
See application file for complete search history.

(56) References Cited

U.S. PATENT DOCUMENTS

| | | | |
|---|---|---|---|
| 5,299,432 A | 4/1994 | Nakae | |
| 9,354,592 B2 * | 5/2016 | Kakutani | ............... G03G 15/80 |

(Continued)

FOREIGN PATENT DOCUMENTS

| | | |
|---|---|---|
| JP | H55082326 A | 6/1980 |
| JP | S63153163 A | 6/1988 |

(Continued)

OTHER PUBLICATIONS

Notice of Allowance issued in U.S. Appl. No. 16/807,560 mailed Jul. 15, 2020.

(Continued)

*Primary Examiner* — Howard J Sanders
(74) *Attorney, Agent, or Firm* — ROSSI, KIMMS & McDOWELL LLP

(57) ABSTRACT

Image forming apparatus have a plurality of models including a common control board and different in number of electrical components used. The image forming apparatus includes a wire harness including: a third connector removably connected to a first connector provided to the control board; fourth connectors removably connected to second connectors provided to the electrical components; and a plurality of cables connecting the third connector and the fourth connectors. In all of the plurality of models, cables are connected to pins located at both ends of the third connector. In a model in which the number of the plurality of cables is smaller than the number of pins of the third connector, pins of the third connector to which the plurality of cables are not connected are arranged at a central portion in a longitudinal direction of the third connector or near the central portion.

7 Claims, 5 Drawing Sheets

(56) References Cited

U.S. PATENT DOCUMENTS

| 2011/0242621 A1 | 10/2011 | Takeuchi |
| 2016/0227065 A1 | 8/2016 | Tamura |
| 2019/0361382 A1 | 11/2019 | Suzuki |

FOREIGN PATENT DOCUMENTS

| JP | H05029058 A | 2/1993 |
| JP | H05172390 A | 7/1993 |
| JP | H07249463 A | 9/1995 |
| JP | 2000322244 A | 11/2000 |
| JP | 2003347032 A | 12/2003 |
| JP | 2006058440 A | 3/2006 |
| JP | 2007305699 A | 11/2007 |
| JP | 2009115898 A | 5/2009 |
| JP | 2013091545 A | 5/2013 |

OTHER PUBLICATIONS

Quayle Action issued in U.S. Appl. No. 16/807,560 mailed Mar. 22, 2021.
Notice of Allowance issued in U.S. Appl. No. 16/807,560 mailed Sep. 29, 2021.
Office Action issued in U.S. Appl. No. 17/527,316 mailed Nov. 23, 2022.
Notice of Non-Responsive Amendment issued in U.S. Appl. No. 17/527,316 mailed Apr. 5, 2023.

* cited by examiner

IMAGE FORMING APPARATUS

BACKGROUND OF THE INVENTION

Field of the Invention

The present invention relates to an image forming apparatus having a plurality of models.

Description of the Related Art

Electrical components such as motors and sensors arranged in, for example, an image forming apparatus are connected to a control board by a wire harness. The wire harness is formed mainly of cables and connectors. At present, the image forming apparatus has a lineup of a plurality of models such as a high-speed machine, a low-speed machine, a full-color machine, and a monochrome machine. In some cases, the number of electrical components to be used may be different among a plurality of models. When different control boards are prepared for the plurality of models, management costs in a factory or a service may increase. Moreover, in a case of assembling a plurality of models on the same assembly line in a factory, when different control boards are prepared for the plurality of models, the control boards may be mistakenly mounted to an incorrect model, which may result in production rework at the time of assembly. In view of the above-mentioned circumstances, in Japanese Patent Application Laid-Open No. H05-172390, there is disclosed standardization of control boards for a plurality of models.

The number of electrical components to be used may be larger in a high-speed machine than that in a low-speed machine, or may be larger in a full-color machine than that in a monochrome machine. Selection of the number of connector pins of the control board is conducted based on the number of connector pins of a model having a larger number of electrical components. Thus, a connector of a model having a smaller number of electrical components may have unoccupied connector pins to which no cable is connected. When the connector has unoccupied pins, at the time of inserting and removing cables by hand, the cables cannot be inserted and removed straight with respect to a mating connector. Thus, in some cases, the connector is obliquely inserted and removed. In such a case, there is a fear in that the cables are not properly inserted or may bend pins of the mating connector. As a result, the connector is not properly connected, which may cause an error.

SUMMARY OF THE INVENTION

In view of the above-mentioned circumstances, the present invention provides an image forming apparatus which is capable of reducing an inclination of a connector at a time of connecting and removing a connector of a wire harness with respect to a connector of a control board to be used in common to a plurality of models.

According to one embodiment of the present invention, there is provided an image forming apparatus comprising: a plurality of conveyance rollers configured to convey a sheet; an image forming unit configured to form an image on the sheet; a first motor; a second motor; a control board configured to control the first motor to rotate a first roller among the plurality of conveyance rollers, and control the second motor to rotate a second roller and a third roller among the plurality of conveyance rollers; a first connector provided to the control board; second connectors provided to the first motor and the second motor, respectively; and a wire harness including: a third connector, which is provided at one end portion of the wire harness, and is removably connected to the first connector; and fourth connectors, which are provided at an other end portion of the wire harness, and are removably connected to the second connectors; and a plurality of cables connecting the third connector and the fourth connectors, wherein a number of the plurality of cables is smaller than a number of pins of the third connector, wherein a first cable of the plurality of cables is connected to a first pin among the pins of the third connector, wherein a second cable of the plurality of cables is connected to a second pin among the pins of the third connector, and wherein a third pin, among the pins of the third connector, to which any of the plurality of cables is not connected is arranged between the first pin and the second pin.

Further features of the present invention will become apparent from the following description of exemplary embodiments with reference to the attached drawings.

DESCRIPTION OF THE EMBODIMENTS (Image Forming Apparatus)

Figure 1:
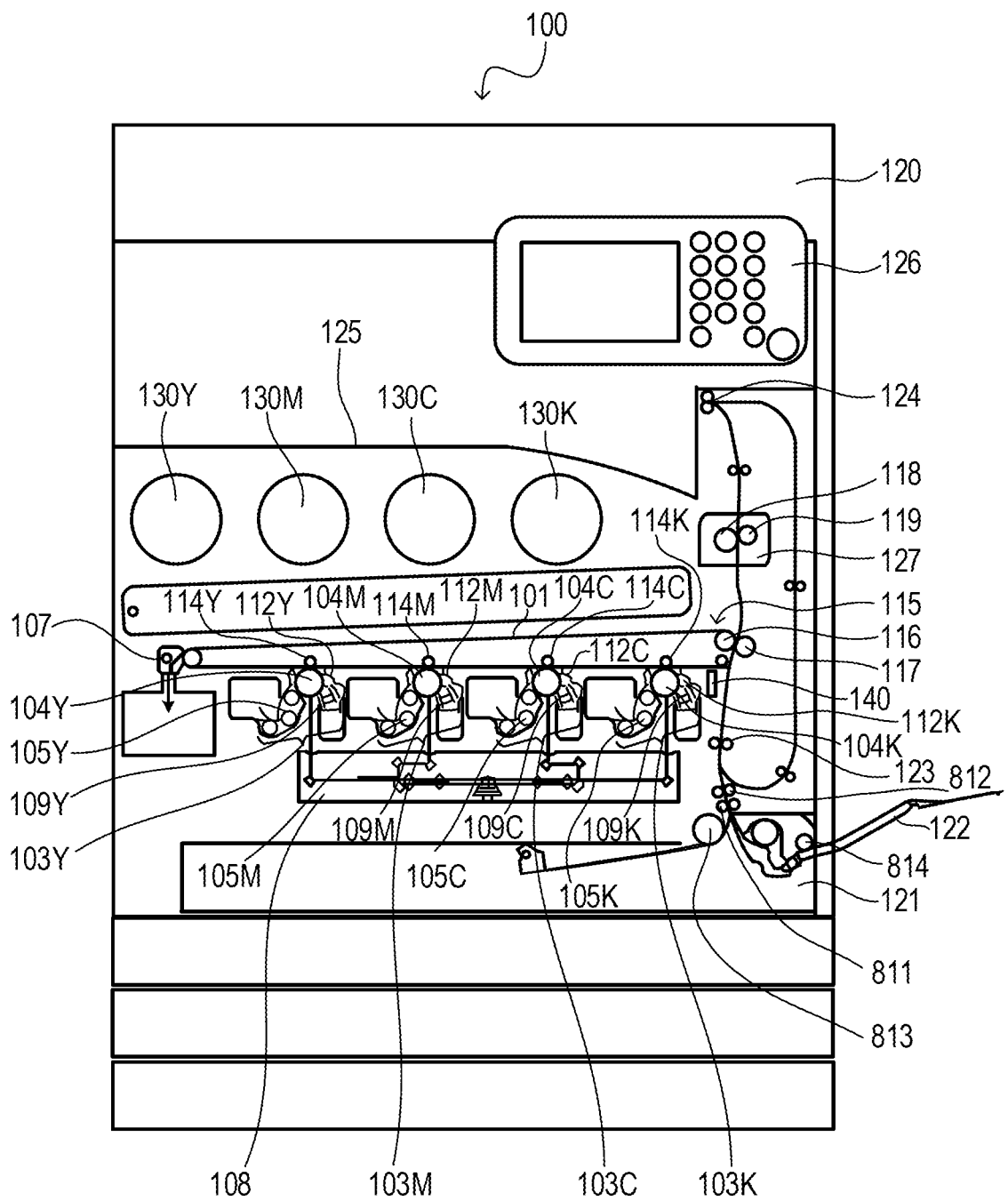
FIG. 1 is a sectional view for illustrating an image forming apparatus.

Now, an embodiment will be described with reference to the drawings. First, a configuration of an image forming apparatus 100 is described with reference to FIG. 1. FIG. 1 is a sectional view for illustrating the image forming apparatus 100. The image forming apparatus 100 according to this embodiment has a plurality of models. The image forming apparatus 100 includes a user interface (hereinafter referred to as "UI") 126 which is to be operated by a user. In this embodiment, illustration is given of an electrophotographic full-color image forming apparatus 100 having such a configuration that toner containers 130Y, 130M, 130C, and 130K for four colors storing developers (hereinafter referred to as "toners") to be supplied to developing devices 105 are mountable and dismountable with respect to the image forming apparatus 100.

The image forming apparatus 100 includes process cartridges 103Y, 103M, 103C, and 103K, which are arranged at constant intervals on a substantially horizontal straight line and serve as image forming units. The process cartridges 103Y, 103M, 103C, and 103K are mountable and dismountable with respect to the image forming apparatus 100. The process cartridges 103Y, 103M, 103C, and 103K are configured to form a yellow image, a magenta image, a cyan image, and a black image, respectively. The characters Y, M, C, and K added to the reference symbols represent yellow, magenta, cyan, and black, respectively. In the following description, the characters Y, M, C, and K added to the reference symbols are omitted when not required. The four process cartridges 103 have the same structure except for the colors of the toners.

Drum-type electrophotographic photosensitive members (hereinafter referred to as "photosensitive drums") 104Y, 104M, 104C, and 104K serving as image bearing members are provided to the process cartridges 103, respectively. A primary charging device 109, the developing device 105, and a drum cleaner device 112 are arranged around each of the photosensitive drums 104. At positions opposed to the photosensitive drums 104 over an intermediate transfer belt 101, there are arranged primary transfer rollers 114, respectively. Below the photosensitive drums 104, there is provided an optical scanning device (hereinafter referred to as "exposure device") 108. The exposure device 108 includes laser light-emitting elements configured to emit laser beams in accordance with time-series electric digital pixel signals corresponding to image information pieces for colors to be input. The exposure device 108 is configured to emit a laser beam to a corresponding one of the photosensitive drums 104 through a space defined between corresponding ones of the primary charging devices 109 and the developing devices 105. The exposure device 108 forms electrostatic latent images in accordance with the image information pieces for colors on corresponding surfaces of the photosensitive drums 104 having been uniformly charged by the primary charging devices 109.

The photosensitive drums 104 each include a drum base member made of aluminum and a layer of an organic photoconductor (OPC) formed on the drum base member. The photosensitive drums 104 are each rotated at a predetermined process speed by a driving device (not shown) described later. The primary charging devices 109 serving as primary charging units are configured to uniformly charge the surfaces of the photosensitive drums 104 to a predetermined electric potential having a negative polarity by a charging bias applied from a charging bias power supply (not shown). The developing devices 105 store toners and are configured to develop the electrostatic latent images formed on the photosensitive drums 104 as toner images (form visible images) by causing toners of corresponding colors to adhere to the photosensitive drums 104. The primary transfer rollers 114 serving as primary transfer units are provided inside an intermediate transfer belt unit 115 so as to be opposed to the photosensitive drums 104 and are urged toward the photosensitive drums 104, respectively. The drum cleaner devices 112 serving as cleaning units include respective cleaning blades configured to remove residual toners, which remain on the surfaces of the photosensitive drums 104 after the primary transfer, from the photosensitive drums 104.

The intermediate transfer belt unit 115 includes a drive roller 116 and a gear (not shown). The drive roller 116 serves also as a secondary transfer opposing roller. The gear is provided on a shaft of the drive roller 116. The gear meshes with a drive gear provided to a main body of the image forming apparatus 100, and the drive roller 116 is rotated by the drive gear. The drive roller 116 is provided so as to be opposed to a secondary transfer roller 117 over the intermediate transfer belt 101 and defines a secondary transfer portion between the secondary transfer roller 117 and the intermediate transfer belt 101. An optical sensor 140 configured to read density-detection toner patches or color-misregistration-correction toner patches formed on the intermediate transfer belt unit 115 is provided on an upstream side of the secondary transfer portion. On a downstream side of the secondary transfer roller 117 in a conveyance direction of a recording medium, there is provided a fixing device 127 including a fixing roller 118 and a pressure roller 119 in a vertical-path configuration.

(Image Forming Operation)

Next, an image forming operation performed by the image forming apparatus 100 is described. Respective image forming processes performed by the four process cartridges 103Y, 103M, 103C, and 103K are the same. When an original reading device 120 reads an image of an original and outputs an image formation start signal, the surfaces of the photosensitive drums 104 rotated at the predetermined process speed are uniformly charged to a negative polarity by the primary charging devices 109. The exposure device 108 emits laser beams from the laser light-emitting elements in accordance with time-series electric digital pixel signals for corresponding colors output from the original reading device 120 to form electrostatic latent images on the surfaces of the photosensitive drums 104. The developing devices 105 to which a developing bias having the same polarity as the charge polarity (negative polarity) of the photosensitive drums 104 has been applied cause toners to adhere to the electrostatic latent images formed on the photosensitive drums 104, to thereby form visible images as toner images. The toner images formed on the photosensitive drums 104 are transferred to the intermediate transfer belt 101 by the primary transfer rollers 114 to which a primary transfer bias (polarity opposite to that of toners (positive polarity)) has been applied.

The yellow toner image, the magenta toner image, the cyan toner image, and the black toner image formed by the process cartridges 103Y, 103M, 103C, and 103K, respectively, are sequentially transferred in superimposition onto the intermediate transfer belt 101. As a result, a full-color toner image is formed on the intermediate transfer belt 101. Residual toners, which remain on the photosensitive drums 104 after the primary transfer, are scraped off and collected by the cleaner blades provided to the drum cleaner devices 112. The full-color toner image formed on the intermediate transfer belt 101 is moved to the secondary transfer portion defined between the drive roller 116 and the secondary transfer roller 117.

Meanwhile, a feeding cassette 121 configured to store recording media (sheets) is provided at a lower part in the image forming apparatus 100. Besides paper such as plain paper and thick paper, examples of the recording media include those made of a freely selected material, specifically, special paper such as coated paper, a plastic film for an overhead projector, and cloth, and those having a freely selected shape, specifically, an envelope and an index sheet. Moreover, a multi-feeding tray 122 on which recording media are placed is provided at a side portion of the image forming apparatus 100. The recording medium fed from the feeding cassette 121 or the multi-feeding tray 122 is conveyed to registration rollers 123 through a conveyance path formed so as to extend in a substantially vertical direction. Specifically, the recording medium stored in the feeding cassette 121 is picked up by a feeding roller 813 and is then fed to a first vertical path roller 811. The recording medium is conveyed by the first vertical path roller 811 to a second vertical path roller 812 and is thereafter conveyed by the first vertical path roller 811 and the second vertical path roller 812 to the registration rollers 123. Moreover, the recording medium placed on the multi-feeding tray 122 is picked up by a multi-feeding roller 814 and is then fed to the first vertical path roller 811. The recording medium is conveyed by the first vertical path roller 811 to the second vertical path roller 812 and is thereafter conveyed by the first vertical path roller 811 and the second vertical path roller 812 to the registration rollers 123.

The registration rollers 123 convey the recording medium to the secondary transfer portion in such a manner that a leading edge of the full-color toner image formed on the intermediate transfer belt 101 and a leading edge of the recording medium match each other at the secondary transfer portion defined between the drive roller 116 and the secondary transfer roller 117. The secondary transfer roller 117 to which the secondary transfer bias (polarity opposite to that of toners (positive polarity)) has been applied collectively transfers the full-color toner image formed on the intermediate transfer belt 101 to the recording medium. Residual toner, which remains on the intermediate transfer belt 101 after the secondary transfer, is scraped off and collected by a transfer cleaning device 107.

The recording medium having the full-color toner image transferred thereto is conveyed to the fixing device 127. The full-color toner image is heated and pressurized at a fixing nip defined between the fixing roller 118 and the pressure roller 119 of the fixing device 127 to be thermally fixed on a surface of the recording medium. As a result, a full-color image is formed on the surface of the recording medium. The recording medium having the full-color image formed thereon is delivered by first delivery rollers 124 onto a delivery tray 125. In such a manner, the series of processes of the image forming operation is terminated.

(Control Unit)

Figure 2:
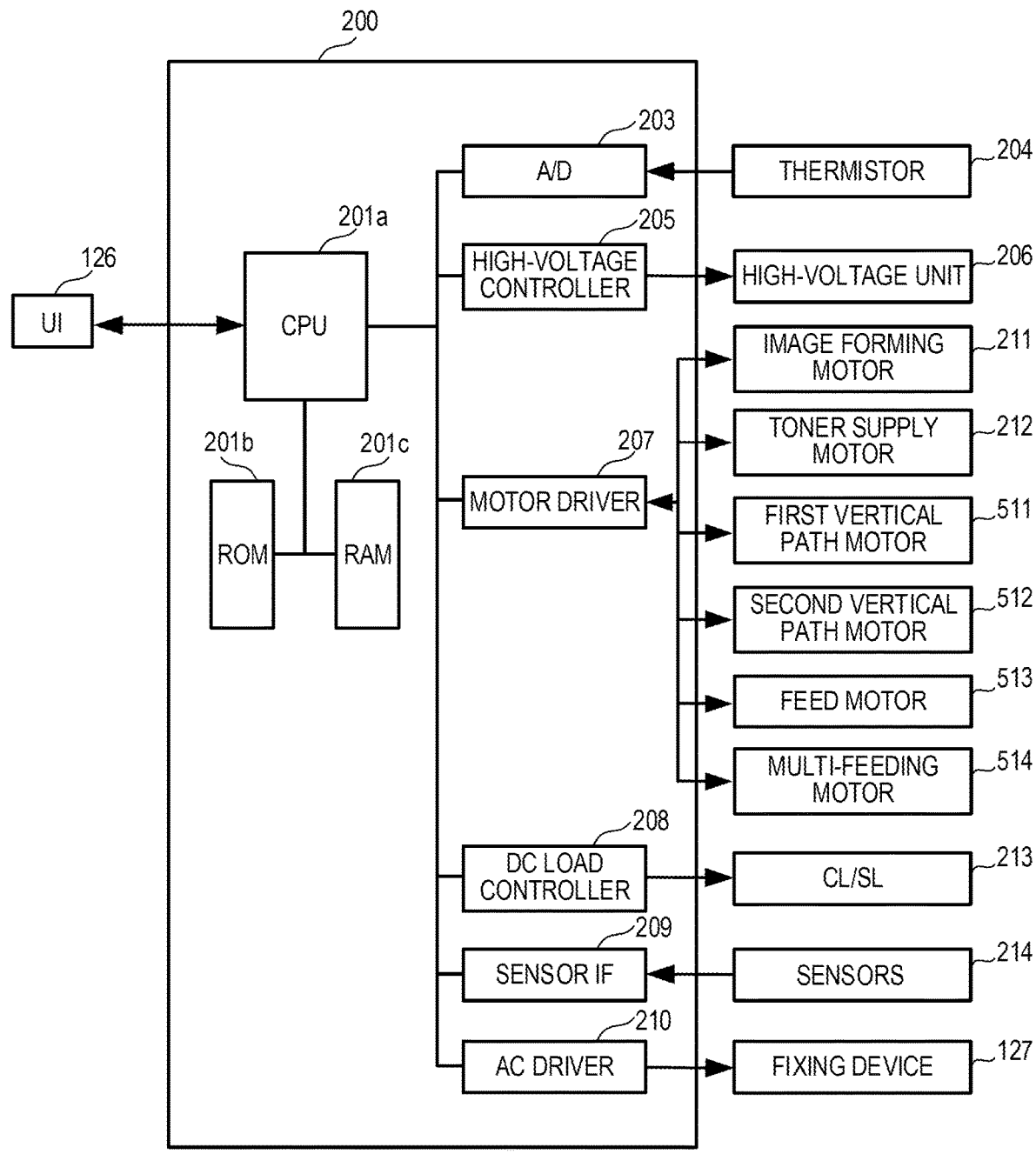
FIG. 2 is a block diagram for illustrating the image forming apparatus.

Next, with reference to FIG. 2, a control unit 200 configured to integrally control the image forming apparatus 100 is described. FIG. 2 is a block diagram for illustrating the image forming apparatus 100. The control unit 200 is a control board to be used in common to all of the plurality of models of the image forming apparatus 100. The control unit 200 has functions to drive loads in the image forming apparatus 100, collect and analyze information pieces given by sensors 214, and exchange data with the UI 126. The control unit 200 includes a central processing unit (hereinafter referred to as "CPU") 201a to perform the functions described above. The control unit 200 further includes a read-only memory (hereinafter referred to as "ROM") 201b, a random-access memory (hereinafter referred to as "RAM") 201c, an analog-digital converter (hereinafter referred to as "A/D") 203, and a high-voltage controller 205. The control unit 200 further includes a motor driver 207, a DC load controller 208, a sensor interface (hereinafter referred to as "sensor IF") 209, and an AC driver 210.

The CPU 201a is configured to execute various sequences associated with predetermined image formation sequences in accordance with a program stored in the ROM 201b. In such an operation, the RAM 201c temporarily or permanently stores rewritable data. The RAM 201c is configured to store, for example, a high-voltage setting value set to the high-voltage controller 205, various data described later, and image formation command information given through the UI 126. The UI 126 is configured to output information such as a copy magnification and a density setting value set by a user to the CPU 201a. The CPU 201a outputs information on a state of the image forming apparatus 100, for example, the number of images to be formed or whether or not the image formation is being performed, occurrence of a jam, and a location of the occurrence of the jam to the UI 126 and presents the information to a user through the UI 126.

The image forming apparatus 100 includes an image forming motor 211, a toner supply motor 212, a first vertical path motor 511, a second vertical path motor 512, a feed motor 513, and a multi-feeding motor 514. The image forming motor 211, the toner supply motor 212, the first vertical path motor 511, the second vertical path motor 512, the feed motor 513, and the multi-feeding motor 514 are electrically connected to the motor driver 207. The image forming apparatus 100 further includes DC loads such as a clutch/solenoid (hereinafter referred to as "CL/SL") (electrical component) 213, and sensors (electrical components) 214 such as a photo-interrupter and a microswitch. The CL/SL 213 is electrically connected to the DC load controller 208. The sensors 214 are electrically connected to the sensor IF 209. The CPU 201a controls the motor driver 207 and the DC load controller 208 to drive various motors and DC loads, to thereby convey the recording medium and drive various units. The CPU 201a acquires detection signals from the sensors 214 through the sensor IF 209 to monitor the conveyance of the recording medium and the operations of the various units.

The control unit 200 controls the image forming motor 211, the toner supply motor 212, the first vertical path motor 511, the second vertical path motor 512, the feed motor 513, and the multi-feeding motor 514 through the motor driver 207 based on the detection signals given by the sensors 214. The control unit 200 drives the CL/SL 213 through the DC load controller 208 to smoothly advance the image forming operation. The CPU 201a outputs various high-voltage control signals to a high-voltage unit 206 through the high-voltage controller 205. The high-voltage unit 206 is configured to allow an appropriate high voltage to be applied to the primary charging devices 109. The CPU 201a controls ON/OFF states of a heater provided in the fixing device 127 through the AC driver 210. The fixing device 127 includes a thermistor 204 configured to measure temperature inside the fixing device 127. A change in resistance value of the thermistor 204, which corresponds to a change in temperature inside the fixing device 127, is converted by the A/D 203 into a voltage value and is thereafter input as a digital value to the CPU 201a. The CPU 201a controls the temperature inside the fixing device 127 through the AC driver 210 based on temperature data being the digital value.

(Modes of Connection between Control Board and Motors)

Figure 3A:
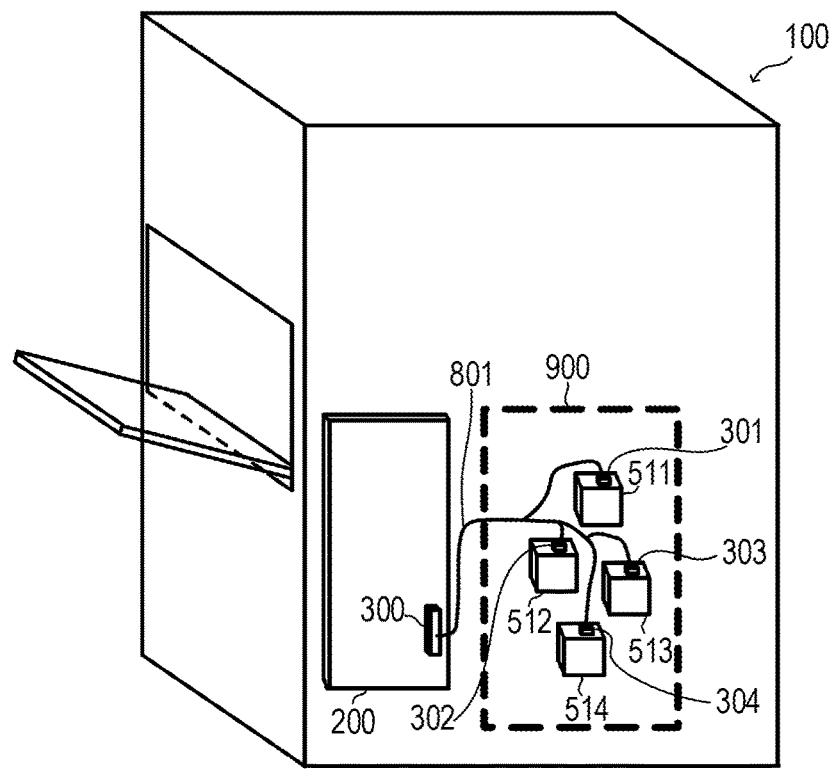
FIG. 3A and FIG. 3B are illustrations of modes of connection between the control board and motors.
Figure 3B:
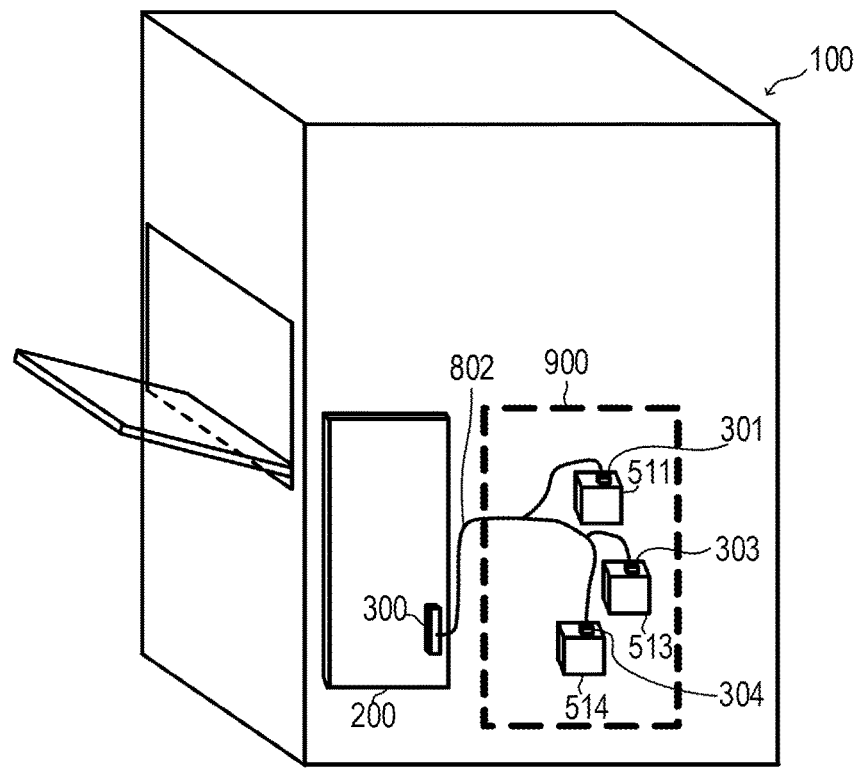

Next, with reference to FIG. 3A and FIG. 3B, modes of connection between the motors provided to the image forming apparatus 100 and the control unit 200 are described. The image forming apparatus 100 has a plurality of models including the control unit 200 to be used in common and being different in number of electrical components to be used. FIG. 3A and FIG. 3B are illustrations of modes of connection between the control unit (control board) 200 and the motors. This embodiment is described with an example in which there are given models being different in number of motors as electrical components to be used depending on the printing speed of the image forming apparatus 100.

FIG. 3A is an illustration of an arrangement of motors in a first model of the image forming apparatus 100 capable of printing seventy sheets per minute. The first vertical path roller 811 is driven by the first vertical path motor (electrical component) 511. The second vertical path roller 812 is driven by the second vertical path motor (electrical component) 512. The feeding roller 813 is driven by the feed motor (electrical component) 513. The multi-feeding roller 814 is driven by the multi-feeding motor (electrical component) 514. The first vertical path motor 511, the second vertical path motor 512, the feed motor 513, and the multi-feeding motor 514 are mounted on a motor mounting sheet metal 900. A connector (first connector) 300 is provided to the control unit 200. A connector 301 is provided to the first vertical path motor 511. A connector 302 is provided to the second vertical path motor 512. A connector 303 is provided to the feed motor 513. A connector 304 is provided to the multi-feeding motor 514. A wire harness 801 connects the connector 300 of the control unit 200 to the connectors 301, 302, 303, and 304 of the four conveyance motors (first vertical path motor 511, second vertical path motor 512, feed motor 513, and multi-feeding motor 514). The control unit 200 controls driving of the four conveyance motors (first vertical path motor 511, second vertical path motor 512, feed motor 513, and multi-feeding motor 514) through the wire harness 801.

FIG. 3B is an illustration of an arrangement of motors in a second model of the image forming apparatus 100 capable of printing thirty-five sheets per minute. The first vertical path motor 511, the feed motor 513, and the multi-feeding motor 514 are mounted on the motor mounting sheet metal 900. The second model capable of printing thirty-five sheets per minute is lower in conveyance speed of the recording medium than the first model capable of printing seventy sheets per minute. Therefore, torques for driving the first vertical path roller 811 and the second vertical path roller 812 are sufficiently satisfied with only the motor torque of the first vertical path motor 511. Accordingly, a gear configuration is modified, and the first vertical path roller 811 and the second vertical path roller 812 are driven through a modified gear mechanism with only the first vertical path motor 511. Thus, the second vertical path motor 512 is not required for the second model capable of printing thirty-five sheets per minute. A wire harness 802 connects the connector 300 of the control unit 200 to the connectors 301, 303, and 304 of the three conveyance motors (first vertical path motor 511, feed motor 513, and multi-feeding motor 514). The control unit 200 controls driving of the three conveyance motors (first vertical path motor 511, feed motor 513, and multi-feeding motor 514) through the wire harness 802.

(Wire Harness)

Figure 4A:
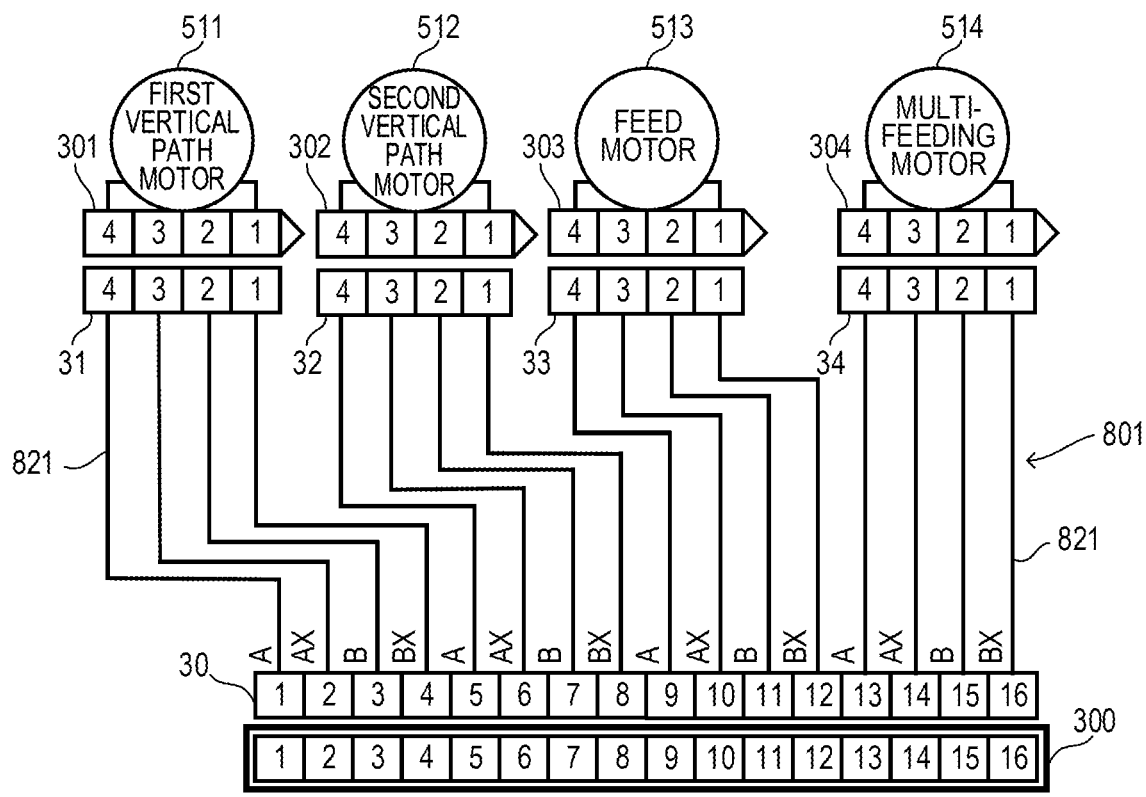
FIG. 4A and FIG. 4B are wiring diagrams for illustrating wiring between a connector of the control board and connectors of conveyance motors.
Figure 4B:
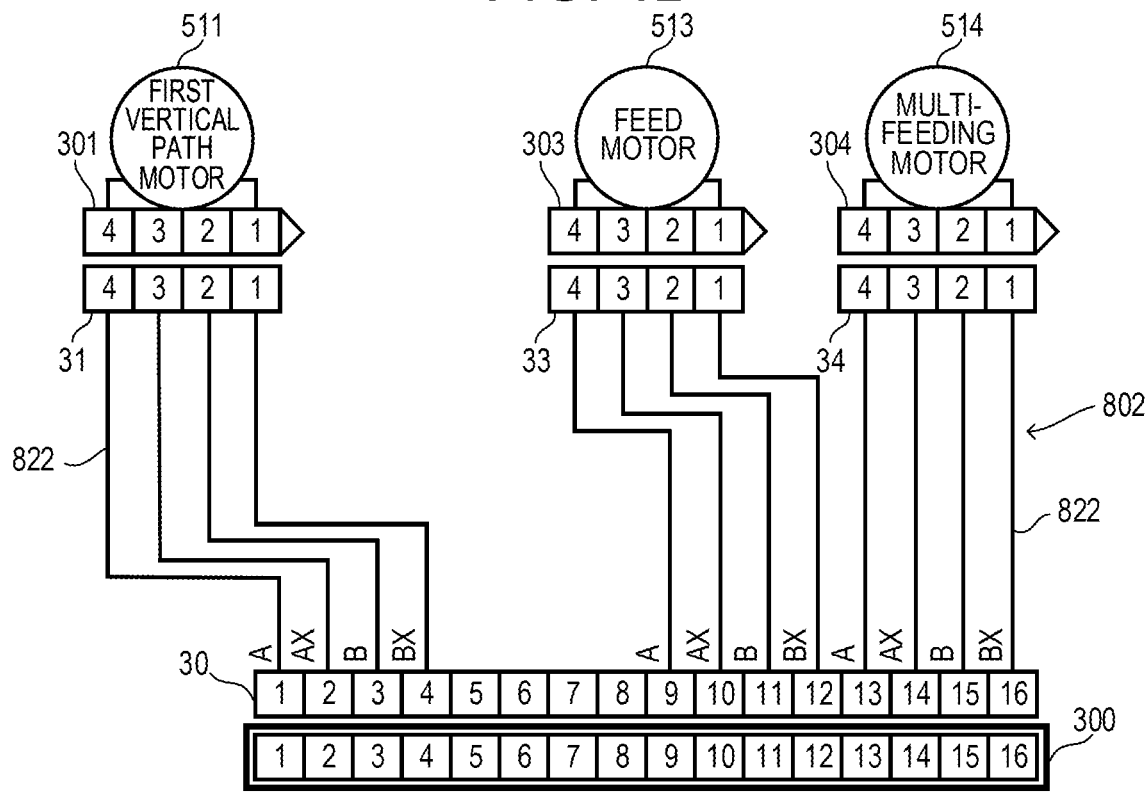

FIG. 4A and FIG. 4B are wiring diagrams for illustrating wiring between the connector 300 of the control unit (control board) 200 and the connectors of the conveyance motors. FIG. 4A is a wiring diagram for illustrating the wire harness 801 of the first model capable of printing seventy sheets per minute. The wire harness 801 has, at one end portion thereof, a connector (third connector) 30 which is connectable and removable with respect to the connector 300 of the control unit 200. The connector 30 is used in common to all of the plurality of models of the image forming apparatus 100. The connector 300 of the control unit 200 includes a plurality of pins. The number of pins of the connector 30 of the wire harness 801 is the same as the number of pins of the connector 300 of the control unit 200. The wire harness 801 has, at the other end portion thereof, four connectors (fourth connectors) 31, 32, 33, and 34. The connector 31 is removably connected to the connector (second connector) 301 of the first vertical path motor 511. The connector 32 is removably connected to the connector (second connector) 302 of the second vertical path motor 512. The connector 33 is removably connected to the connector (second connector) 303 of the feed motor 513. The connector 34 is removably connected to the connector (second connector) 304 of the multi-feeding motor 514.

The first vertical path motor 511, the second vertical path motor 512, the feed motor 513, and the multi-feeding motor 514 are driven by the motor driver 207 mounted to the control unit 200. An A-phase signal at the 1st pin of the connector 30 is connected by a cable 821 to the 4th pin of the connector 31 connected to the connector 301 of the first vertical path motor 511. An AX-phase signal at the 2nd pin of the connector 30 is connected by a cable 821 to the 3rd pin of the connector 31 connected to the connector 301 of the first vertical path motor 511. A B-phase signal at the 3rd pin of the connector 30 is connected by a cable 821 to the 2nd pin of the connector 31 connected to the connector 301 of the first vertical path motor 511. A BX-phase signal at the 4th pin of the connector 30 is connected by a cable 821 to the 1st pin of the connector 31 connected to the connector 301 of the first vertical path motor 511.

As illustrated in FIG. 4A, the 5th to 8th pins of the connector 30 are connected by the cables 821 to the connector 32 connected to the connector 302 of the second vertical path motor 512. The 9th to 12th pins of the connector 30 are connected by the cables 821 to the connector 33 connected to the connector 303 of the feed motor 513. The 13th to 16th pins of the connector 30 are connected by the cables 821 to the connector 34 connected to the connector 304 of the multi-feeding motor 514. In the first model illustrated in FIG. 4A, the cables 821 are connected to all of the sixteen pins of the connector 30. Thus, one cable of the plurality of cables 821 is connected to the pin (1st pin) located at one end portion of the connector 30, and another cable of the plurality of cables 821 is connected to the pin (16th pin) located at the other end portion of the connector 30.

In the first model, four conveyance motors at maximum are electrically connected to the connector 300 of the control unit 200. However, the maximum number of conveyance motors connected to the connector 300 is not limited to four. It is only required that the maximum number of conveyance motors electrically connectable to the connector 300 be three or more.

FIG. 4B is a wiring diagram for illustrating the wire harness 802 of the second model capable of printing thirty-five sheets per minute. The wire harness 802 has, at one end portion thereof, the connector (third connector) 30 which is connectable and removable with respect to the connector (first connector) 300 of the control unit 200. The connector 30 for the first model is used also as the connector 30 for the second model. Thus, the number of pins of the connector 30 of the wire harness 802 is the same as the number of pins of the connector 300 of the control unit 200. However, the number of the plurality of cables 822 of the wire harness 802 (twelve) is smaller than the number of pins of the connector 30 (sixteen). The wire harness 802 has, at the other end portion thereof, three connectors (fourth connectors) 31, 33, and 34. The connector 31 is removably connected to the connector (second connector) 301 of the first vertical path motor 511. The connector 33 is removably connected to the connector (second connector) 303 of the feed motor 513. The connector 304 is removably connected to the connector (second connector) 304 of the multi-feeding motor 514. Thus, one cable of the plurality of cables 822 is connected to the pin (1st pin) located at the one end portion of the connector 30, and another cable of the plurality of cables 822 is connected to the pin (16th pin) located at the other end portion of the connector 30. In the second model, the second vertical path motor 512 is not required. Therefore, the number of cables 822 of the wire harness 802 (twelve in this embodiment) is smaller than the number of pins of the connector 30. The cables 822 are not connected to the 5th pin, the 6th pin, the 7th pin, and the 8th pin of the connector 30. The 5th pin, the 6th pin, the 7th pin, and the 8th pin of the connector 30 to which the cables 822 are not connected are arranged at a central portion in a longitudinal direction of the connector 30 or near the central portion.

In the second model, three conveyance motors are electrically connected to the connector 300 to which four conveyance motors at maximum are connectable, but the number of conveyance motors connected to the connector 300 is not limited to three. It is preferred that at least two conveyance motors be electrically connected to the connector 300.

(Connector)

Figure 5A:
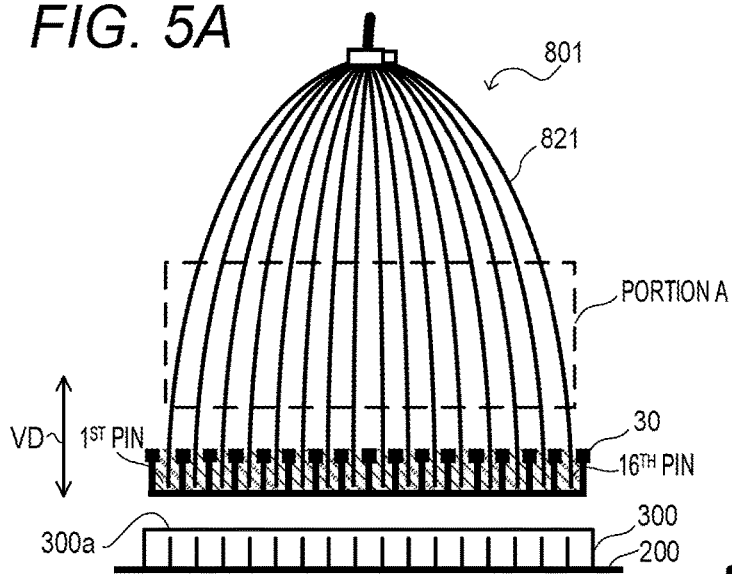
FIG. 5A, FIG. 5B, and FIG. 5C are illustrations of cables connected to pins of the connector.
Figure 5B:
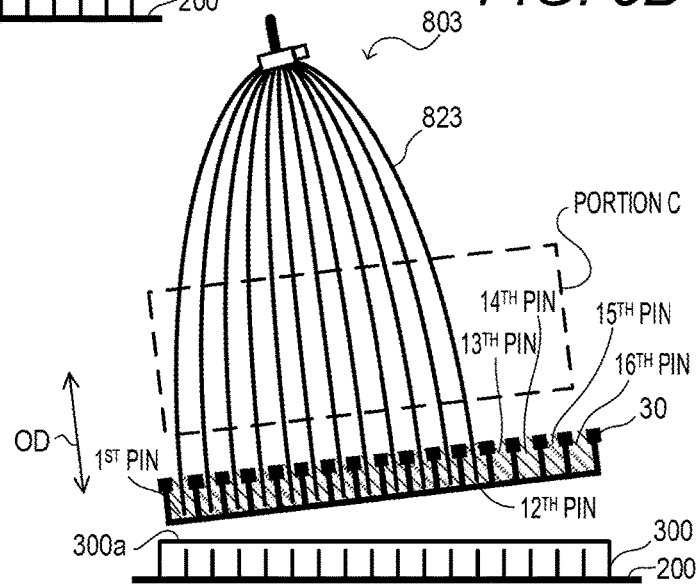
Figure 5C:
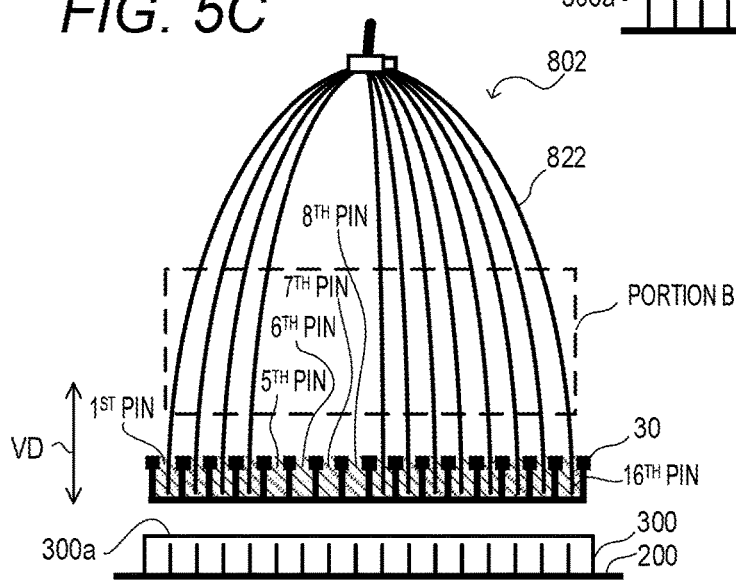

FIG. 5A, FIG. 5B, and FIG. 5C are illustrations of the cables 821, 822, and cables 823 connected to the pins of the connector 30. FIG. 5A is an illustration of a state in which the cables 821 are connected to all of the sixteen pins of the connector 30 in this embodiment. When the connector 30 is inserted and removed with respect to the connector 300 by nipping the portion A of the wire harness 801 with fingers in this state, the connector 30 is in a state in which a posture thereof is stable. That is, a position of the connector 30 of the wire harness 801 can easily be determined with respect to a surface (hereinafter referred to as "connector surface") 300a at a top portion of the connector 300 of the control unit 200, thereby being capable of inserting and removing the connector 30 with respect to the connector 300 in a vertical direction VD. The ease of inserting and removing the connector 30 is excellent, and hence the connector 30 can be correctly thrust into the connector 300, thereby being capable of reliably fitting the connector 300 and the connector 30 to each other.

Next, FIG. 5B is an illustration of a reference example. In the reference example illustrated in FIG. 5B, illustration is given of a state in which the cables 823 are not connected to the 13th pin, the 14th pin, the 15th pin, and the 16th pin of the connector 30. When the connector 30 is inserted and removed with respect to the connector 300 by nipping the portion C of the wire harness 803 with fingers in this state, stress is applied to the 1st to 12th pins of the connector 30, with the result that the connector 30 is brought into a state in which a posture thereof is not stable. Therefore, there is difficulty in determining a position of the connector 30 of the wire harness 803 with respect to the connector surface 300a of the connector 300 of the control unit 200, with the result that the connector 30 is liable to be inserted and removed with respect to the connector 300 in an oblique direction OD. As a result, at the time of inserting and removing the connector 30, the pins of the connector 300 may be bent, or the connector 30 cannot be correctly thrust into the connector 300.

Next, FIG. 5C is an illustration of a state in which the cables 822 are not connected to the 5th pin, the 6th pin, the 7th pin, and the 8th pin of the connector 30 in this embodiment. When the connector 30 is inserted and removed with respect to the connector 300 by nipping the portion B of the wire harness 802 with fingers in this state, stress is applied also to the 1st pin and the 16th pin located at both ends of the pin connector 30, and hence the connector 30 is brought into a state in which a posture thereof is stable. Thus, similarly to the state illustrated in FIG. 5A, a position of the connector 30 of the wire harness 802 can easily be determined with respect to the connector surface 300a of the connector 300 of the control unit 200, thereby being capable of inserting and removing the connector 30 with respect to the connector 300 in the vertical direction VD. The ease of inserting and removing the connector 30 can be favorably maintained, and hence the connector 30 can be correctly thrust into the connector 300, thereby being capable of reliably fitting the connector 300 and the connector 30 to each other.

This embodiment has been described with the example of the image forming apparatus 100 having a plurality of models including the control unit 200 to be used in common and being different in number of motors as electrical components to be used. However, this embodiment is applicable also to an image forming apparatus having a plurality of models including the control unit 200 to be used in common and being different in number of sensors 214, CL/SLs 213, solenoids, or switches as electrical components to be used.

This embodiment has been described with the example in which the first model is a high-speed machine and the second model is a low-speed machine. However, this embodiment is not limited to this example. For example, the first model may be a full-color machine, and the second model may be a monochrome machine. According to this embodiment, with regard to a product having a plurality of models such as a high-speed machine and a low-speed machine, a full-color machine and a monochrome machine, and the like, even when the control board is standardized, the connectors can be correctly inserted and removed without degrading the ease of inserting and removing the connectors.

According to this embodiment, an inclination of the connector 30 at the time of connecting and removing the connector 30 of the wire harness 801, 802 with respect to the connector 300 of the control unit 200 to be used in common to a plurality of models can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-040120, filed Mar. 6, 2019, which is hereby incorporated by reference herein in its entirety.

What is claimed is:

1. An image forming apparatus comprising:
   an image forming unit configured to form an image on a sheet;
   a first load configured to be rotationally driven in an image formation by the image forming unit;
   a second load configured to be rotationally driven in the image formation by the image forming unit;
   a control board configured to drive the first load and the second load;
   a first connector to which first cables used to drive the first load and second cables used to drive the second load are connected; and
   a second connector configured to connect to the first connector, the second connector being mounted on the control board,
   wherein the first connector has first connecting portions to which the first cables are connected, second connecting portions to which the second cables are connected, and third connecting portions to which no cables are connected, and
   wherein the third connecting portions are located between the first connecting portions and the second connecting portions.

2. The image forming apparatus according to claim 1, wherein a number of the third connecting portions is equal to a number of the first connecting portions.

3. The image forming apparatus according to claim 1,
   wherein a type of the first load is a predetermined type, and
   wherein a type of the second load is the predetermined type.

4. The image forming apparatus according to claim 1, wherein a number of the first cables is equal to a number of the second cables.

5. The image forming apparatus according to claim 1, further comprising a third load,
   wherein the first connector has fourth connecting portions to which other cables used to drive the third load are connected.

6. The image forming apparatus according to claim 1, further comprising:
   a first conveyance roller configured to convey the sheet; and
   a second conveyance roller configured to convey the sheet,
   wherein the first load is a first motor,
   wherein the second load is a second motor, and
   wherein the control board controls the first motor to rotate the first conveyance roller, and controls the second motor to rotate the second conveyance roller.

7. The image forming apparatus according to claim 1,
   wherein the first cables have a third connector provided to the first load, and a fourth connector configured to connect to the third connector, and
   wherein the second cables have a fifth connector provided to the second load, and a sixth connector configured to connect to the fifth connector.

\* \* \* \* \*